UNITED STATES PATENT OFFICE.

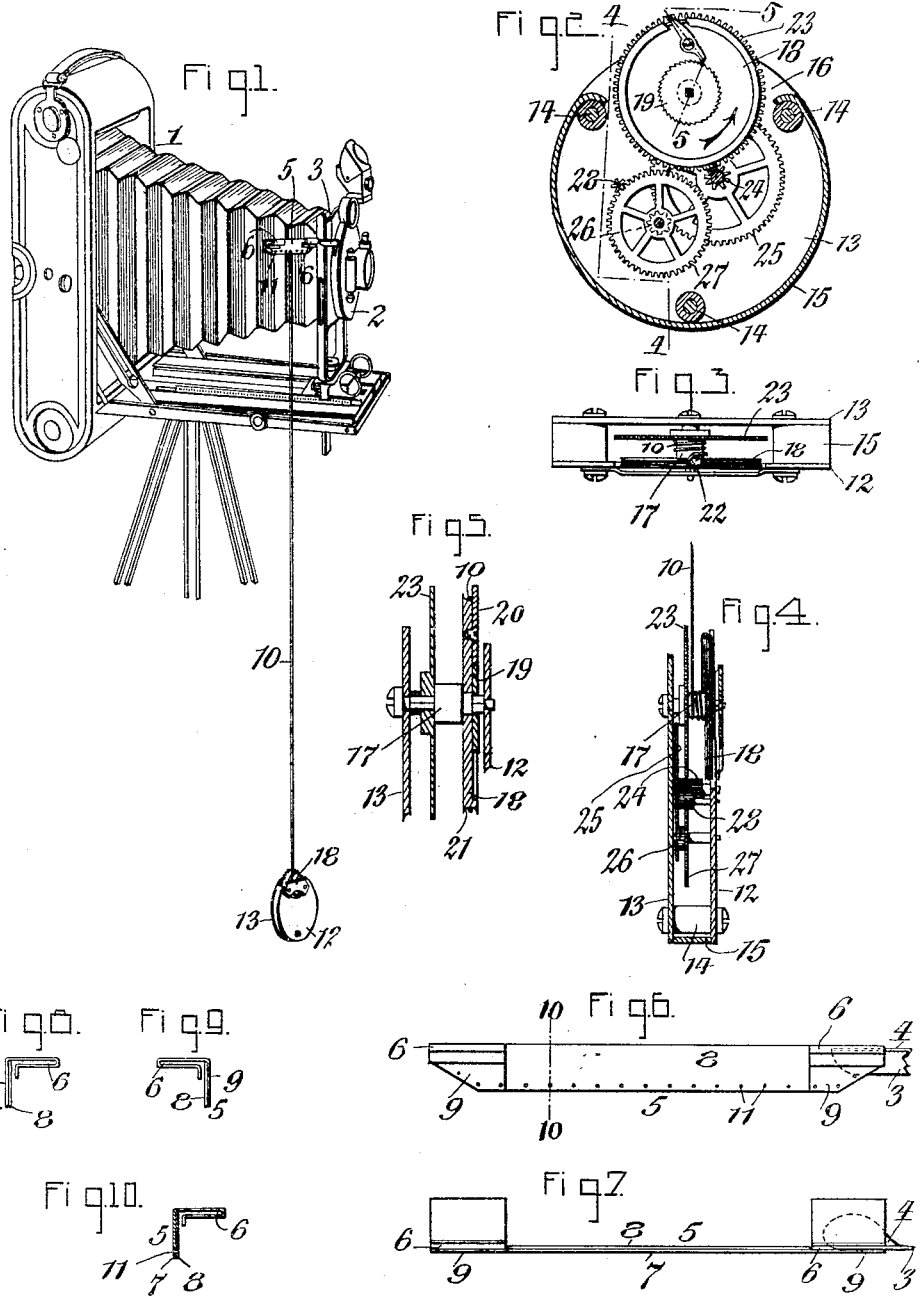

FLOYD L. SCOTT, OF BUFFALO, NEW YORK.

CAMERA-OPERATING DEVICE.

1,205,486. Specification of Letters Patent. Patented Nov. 21, 1916.

Application filed October 27, 1914, Serial No. 868,845. Renewed September 30, 1916. Serial No. 123,196.

*To all whom it may concern:*

Be it known that I, FLOYD L. SCOTT, a citizen of the United States, residing at Buffalo, in the county of Erie and State of New York, have invented new and useful Improvements in Camera-Operating Devices, of which the following is a specification.

This invention relates to a camera operating device which permits of operating the camera automatically at a predetermined time and thereby enables the person setting the camera to appear in the picture taken by the same and also enables other pictures to be taken automatically where the actual manipulation of the shutter of the camera by a person is undesirable.

In the accompanying drawings: Figure 1 is a perspective view of a camera equipped with my improved operating device. Fig. 2 is a vertical longitudinal section, on an enlarged scale, of the timing mechanism of the camera operating device. Fig. 3 is a top plan view of the same. Fig. 4 is a vertical transverse section taken on line 4—4, Fig. 2. Fig. 5 is a fragmentary vertical section, on an enlarged scale, on line 5—5, Fig. 2. Fig. 6 is a side elevation, on an enlarged scale, of the clip whereby the camera operating device is attached to the trigger or finger piece of the camera. Fig. 7 is a bottom plan view of the same. Figs. 8 and 9 are elevations of said clip viewed from opposite ends thereof, respectively. Fig. 10 is a vertical transverse section taken on line 10—10, Fig. 6. Fig. 11 is a fragmentary perspective view of the trigger or finger piece of the camera.

Similar characters of reference indicate corresponding parts throughout the several views.

My improved camera operating device is applicable to cameras which are of different design and which may vary widely in construction so far as the shutter operating mechanism is concerned, inasmuch as the operating device embodying my invention coöperates only with the trigger or finger piece whereby the shutter mechanism is actuated. The camera 1 shown in the drawing is therefore regarded merely as typical of one of the various forms suitable for receiving my invention and as there shown the shutter mechanism of this camera is provided with a trigger or trip finger which projects laterally from the head 2 at the front end of the camera containing the shutter mechanism. This trigger or trip finger is variously constructed by different manufacturers of cameras but in most instances this trigger comprises a vertical bar or flange 3 and a horizontal lip or flange 4 projecting either forwardly, as shown by full lines in Figs. 6 and 11, or rearwardly, as shown by dotted lines in Fig. 11.

The camera operating device containing my invention may be varied in details of construction, its essential characteristic, however, consisting in so mounting a pendant upon the trigger of the camera that at a predetermined time this pendant while suspended from said trigger will be permitted to drop quickly a short distance and thereby add the momentum or dynamic force of this pendant to its normal weight or static force, whereby a sudden or hammer-like blow is produced sufficient to cause the same to overcome the pressure of the spring which holds the trigger in its elevated position and to depress the trigger so as to operate the shutter mechanism and cause a picture of it to be taken.

The form of camera operating device which is shown in the drawings has been found suitable and satisfactory in practice and as there shown the same is constructed as follows:

Upon the outer end of the trigger the same is adapted to receive a clip for attaching the camera operating device to this trigger. In its preferred form this clip comprises a substantially horizontal body or bar 5 which has its flat sides arranged vertically and two L-shaped sockets 6 which are arranged at opposite ends of the body or bar and either one of which is adapted to receive the L-shaped end of a camera or trigger formed by the vertical and horizontal flanges 3, 4 of the latter. The trigger is merely held by frictional engagement with the socket of the clip this being sufficient for all practical purposes and therefore permitting the same to be quickly attached to and removed from the trigger as well as simplifying the construction of clip and reducing its cost of manufacture. Both of the L-shaped sockets of the clip project laterally from the same side thereof so that in effect one is a right hand socket and the other a left hand socket, thereby enabling one of these sockets to be engaged with the L-shaped trigger of the camera having its upper trigger flange 4 projecting forwardly while the other socket of the clip may be engaged similarly with the trigger if the upper flange of the same projects rearwardly. It is therefore possible for the same clip to be used on cameras in which the upper trigger flange 4 projects either forwardly or rearwardly and therefore avoids the necessity for making different kinds of clips to suit the most common types of cameras now generally found on the market. For the sake of lightness, simplicity and economy this clip is preferably constructed from a single sheet of metal so that the central part of the bar consists of two leaves 7, 8 which are folded vertically flatwise against each other while the sockets 6, 6 project laterally from extensions 9, 9 at opposite ends of one of these leaves which form the body or bar of the clip, as shown in Figs. 6–10. To this clip a suspension thread, cord or line 10 is adapted to be secured with its upper end while the lower end thereof supports the pendant timing or controlling mechanism. Means are provided whereby this thread may be conveniently attached to the clip at different distances from the trigger for varying the pulling effect of the pendant timing mechanism suspended from this thread in accordance with the resisting effect of the spring in the shutter head which normally holds the trigger yieldingly in its elevated position. The preferred means for thus adjustably securing the suspension thread at different points lengthwise of the clip consists of a plurality of openings or perforations 11 formed in a longitudinal row in the bar or body of the clip adjacent to the lower edge thereof and through any one of which the upper end of the thread is adapted to be passed and secured by tying or in any suitable manner. By this means the leverage of the trigger may be increased or decreased so as to vary the pulling effect of the pendant upon the trigger to suit the strength of the trigger lifting spring of the particular camera upon which this camera operating device is intended to be used.

The pendant pulling mechanism which is mounted upon the lower end of the suspension thread or line which operates at a predetermined time to produce a sudden downward pull or jerk on the trigger for depressing the same and causing a picture to be taken is preferably constructed as follows: This pulling mechanism is mounted on a frame or casing which preferably comprises two flat front and rear walls or side plates 12, 13 of substantially circular or disk-shaped form, stays 14 which connect these two side plates in spaced relation so as to provide a compartment within the frame for the reception of the working parts and a crescent-shaped wall 15 which connects the marginal portions of the side plates and has its opposing ends separated by a gap 16 through which parts of the working mechanism project from the interior or exterior of the casing or frame, so that they are accessible and can be operated by the fingers of a person.

Within the casing or frame is arranged the mechanism whereby this frame and the mechanism mounted thereon is free to descend regularly and smoothly and uniformly on the suspension thread for a predetermined period and then suddenly drop for a short distance so that the inertia of these parts is added to the normal weight of the same causing a sudden downward pull of increased strength or effect to be exerted upon the trigger. In its preferred form this timing mechanism comprises a horizontal drum 17 journaled transversely in suitable bearings on the casing or frame, a drop wheel 18 preferably journaled concentrically with this drum at one end thereof, and means for connecting and disconnecting said drum and drop wheel so as to compel the same to turn forwardly together or permit these members to turn independently of each other, said coupling members preferably comprising a ratchet wheel 19 secured to the drum so as to turn therewith and a coupling pawl or dog 20 pivoted on the outer side of the drop wheel and adapted to be engaged with or disengaged from one or another of the teeth of the ratchet wheel. The periphery of the drop wheel is provided with an annular groove 21 and the inner flange of this wheel forming said groove is cut away at one point, preferably at a point adjacent to the dog so as to form a laterally opening notch or passageway 22 from the bottom of the groove in the drop wheel to the inner side thereof. The suspension thread or line is preferably secured at its lower end to the drop wheel in the bottom of the groove thereof adjacent to the front side of the notch 22 thereof and is then passed around the groove of this wheel one complete turn up to this notch, then passed laterally inward through said notch and then wound one or more times around the periphery of the drum from whence it passes upwardly to the clip. The diameter of the drum is relatively small compared with the diameter of the drop wheel which latter is nearly six times as large in diameter as the drum, although the relative dimensions of these parts may be varied, it being desirable, although not absolutely necessary, that the drop wheel be of larger diameter than the drum.

Retarding means are associated with the drum which operate to prevent rapid rotation of the same so that unwinding of the thread or line from this drum by reason of the weight of the pendant timing device hanging from the thread is checked. This retarding effect may be obtained in a variety of ways, the device shown in the drawings being merely an example of one which is suitable and therefore preferred. As there shown this retarding device is constructed in the form of a train of gearing which is set in motion by the rotation of the drum and which by resistance of its members when turned by the drum permits the latter to turn only at a comparatively slow rate. In its preferred organization this retarding gearing comprises a master or first gear wheel 23 secured to the drum so as to turn therewith and meshing with a first pinion 24 journaled on the pendant frame, an intermediate or second gear wheel 25 connected with the first pinion 24 and meshing with a second pinion 26 journaled on the pendant frame, and a third gear wheel 27 connected with the second pinion 26 and meshing with a third pinion 28 journaled on the pendant frame. As the drum turns its rotation is retarded by reason of the train of gearing just described which is set in motion by this movement of the drum and the latter is therefore retarded in its rotary movement and caused to pay off slowly the thread or suspension line wound on the same.

When it is desired to use this operating device the coupling dog 20 is turned in the direction for engaging the same with the ratchet wheel 19 and thereby cause the drop wheel and the drum to be coupled and turned together. By placing the finger in engagement with the upper part of the first gear wheel which projects through the gap 16 of the pendant casing and is exposed above the upper edge of the same and moving the latter forwardly in the direction of the arrow indicated in Fig. 2, the drum and drop wheel are also turned in this direction and the train of gearing is set in motion although no benefit is derived at this time from such motion of the gearing. While the drop wheel is thus turned in this direction the lower part of the suspension thread or line is wound once around the peripheral groove of the drop wheel and during the further forward turning movement of the drum and drop wheel this thread is passed laterally through the notch in the drop wheel and the intermediate part of the thread is wound one or more times around the drum the number of times which the thread is wound around the drum depending upon the predetermined duration of time which is to elapse between the setting up of the camera ready to take a picture and the actual time when the picture is to be taken. After the desired length of suspension line has been wound upon the drum the dog 20 is shifted so that it is disengaged from the ratchet wheel, thereby disconnecting the drum and drop wheel. The clip to which the upper end of the suspension line has been attached at the proper place is applied to the trigger or trip finger of the camera and the weight of the timing or controlling mechanism is permitted to hang upon the lower part of the suspension line, as shown in Fig. 1. The instant this weight hangs on the suspension line that portion wound upon the drum begins to unwind and the latter is turned backwardly by reason of the frictional grip of the thread on the same. The backward or unwinding rotation is, however, uniform or regular and slow on account of the retarding gearing which is operatively associated with the drum whereby the unwinding of the thread from the drum and the descent of the timing mechanism proceeds slowly. The instant that the thread is completely unwound from the drum the unwinding operation is transferred from the drum to the drop wheel and when this occurs the drop wheel is very rapidly rotated one complete turn by reason of the unwinding of the thread therefrom under the weight of the timing mechanism, this rapid rotation of the drop wheel being possible on account of the fact that the same is disconnected from the drum and is not retarded by the train of gearing or any other devices which would impede the rotation of the same. The result is that the timing mechanism drops very suddenly or rapidly a distance equal in length to that part of the suspension thread which was wound around the drop wheel, whereby a quick and forcible downward pull is exerted upon the trigger in addition to that normally exerted by the normal weight of the timing device while the same is moving uniformly, evenly and smoothly downward on the line or thread, thereby causing the trigger or finger piece to be depressed the requisite extent for causing the shutter mechanism to be operated and a picture to be taken.

By varying the size or diameter of the drop wheel or winding the thread more than once around the periphery of the drop wheel the extent of the sudden drop of the timing mechanism may be varied to suit different requirements, and by winding more or less of the suspension thread or pull line on the drum the time which intervenes between the setting up of the camera and the actual taking of the picture may be either lengthened or shortened as occasion requires.

This camera operating device is exceedingly simple in construction, the same is very compact so that it can be carried about conveniently, the same has no delicate parts which are liable to get out of order, and it can be very easily operated and readily applied to most of the cameras now on the market, thereby enabling the field of usefulness of a camera to be materially increased for profit and pleasure.

I claim as my invention:

1. An operating device for a camera having its shutter mechanism provided with a trigger having an L-shaped outer end, comprising a clip provided at its opposite ends with right and left hand L-shaped sockets one or the other of which is adapted to receive the L-shaped outer end of said trigger, and a timing device connected with said clip.

2. An operating device for a camera having its shutter mechanism provided with a trigger comprising a clip having its central part constructed of two folded leaves of metal, extensions at opposite ends of one of said leaves and sockets on said extensions either one or the other of which is adapted to receive the end of said trigger, and a timing device connected with said clip.

3. An operating device for a camera having its shutter mechanism provided with a trigger, comprising a clip adapted to be connected with said trigger and provided with a longitudinal row of openings, and a timing device having a suspending thread adapted to be secured in one or the other of said openings.

4. An operating device for a camera having its shutter mechanism provided with a trigger, comprising a thread attached at its upper end to said trigger, and storing elements from which the lower end of said thread is paid out by the weight of said elements and associated parts.

5. An operating device for a camera having its shutter mechanism provided with a trigger, comprising a thread attached at its upper end to said trigger, storing elements from which the lower end of said thread is paid out by the weight of said elements and associated parts, and which are organized to cause the first part of said thread to be paid out from said elements slowly and uniformly and the last part thereof to be paid out rapidly.

6. An operating device for a camera having its shutter mechanism provided with a trigger, comprising a thread attached at its upper end to said trigger, rotatable elements from which the lower end of said thread is unwound by the weight of said elements and associated parts, and which are organized to cause the first part of said thread to be unwound from said elements slowly and uniformly and the last part thereof to be unwound rapidly.

7. An operating device for a camera having its shutter mechanism provided with a trigger, comprising a thread adapted to be connected at its upper end to said trigger, a drum upon which the lower part of said thread is wound and whereby said drum and associated parts are suspended by said thread, and a frame on which said drum is rotatably mounted.

8. An operating device for a camera having its shutter mechanism provided with a trigger, comprising a thread adapted to be connected at its upper end to said trigger, a drum upon which the lower part of said thread is wound and whereby said drum and associated parts are suspended by said thread, a frame on which said drum is rotatably mounted, and a retarding device mounted on said frame and operatively connected with said drum for preventing rapid rotation of the same.

9. An operating device for a camera having its shutter mechanism provided with a trigger, comprising a thread adapted to be connected at its upper end to said trigger, a drum upon which the lower part of said thread is wound and whereby said drum and associated parts are suspended by said thread, a frame on which said drum is rotatably mounted, and a retarding device mounted on said frame and operatively connected with said drum for preventing rapid rotation of the same, comprising a train of gearing the members of which intermesh and one of which rotates with said drum.

10. An operating device for a camera having its shutter mechanism provided with a trigger, comprising a thread adapted to be connected at its upper end with said trigger, a frame, a drum mounted on said frame, a drop wheel mounted on said frame, the lower end of said thread being connected with said wheel and wound on the same and the intermediate part of said thread being wound on said drum, a retarding device mounted on said frame and operatively connected with said drum to prevent rapid rotation thereof, and means for coupling and uncoupling said drum and wheel.

11. An operating device for a camera having its shutter mechanism provided with a trigger, comprising a thread adapted to be connected at its upper end with said trigger, a frame, a drum mounted on said frame, a drop wheel mounted on said frame, the lower end of said thread being connected with said wheel and wound on the same and the intermediate part of said thread being wound on said drum, a retarding device mounted on said frame and operatively connected with said drum to prevent rapid rotation thereof, and means for coupling and uncoupling said drum and wheel, comprising a ratchet wheel turning with said drum, and a dog mounted on said drop wheel and adapted to be moved into and out of engagement with one or the other of the teeth of said ratchet wheel.

12. An operating device for a camera having its shutter mechanism provided with a trigger, comprising a thread adapted to be connected at its upper end with said trigger, a frame, a drum mounted on said frame, a drop wheel mounted on said frame and provided with a peripheral groove and a notch leading from this groove laterally toward said drum, the lower part of said thread being connected with said drum and wound in the groove and the notch thereof and the intermediate part of said thread being wound on said drum, a retarding device operating to prevent rapid rotation of said drum, and means for operatively connecting and disconnecting said drum and wheel.

13. An operating device for a camera having its shutter mechanism provided with a trigger, comprising a thread adapted to be connected at its upper end with said trigger, a frame, a drum mounted on said frame, a drop wheel mounted on said frame, said wheel being of larger diameter than said drum, the lower end of said thread being connected with said wheel and wound on the same and the intermediate part of said thread being wound on said drum, a retarding device mounted on said frame and operatively connected with said drum to prevent rapid rotation thereof, and means for coupling and uncoupling said drum and wheel.

14. An operating device for a camera having its shutter mechanism provided with a trigger, comprising a thread adapted to be connected at its upper end with said trigger, a frame, a drum mounted on said frame, a drop wheel mounted on said frame, said wheel being of larger diameter than said drum and arranged concentrically with the latter, the lower end of said thread being connected with said wheel and wound on the same and the intermediate part of said thread being wound on said drum, a retarding device mounted on said frame and operatively connected with said drum to prevent rapid rotation thereof, and means for coupling and uncoupling said drum and wheel.

Witness my hand this 13th day of October, 1914.

FLOYD L. SCOTT.

Witnesses:
V. H. Box,
E. W. Rubeck.

Copies of this patent may be obtained for five cents each, by addressing the "Commissioner of Patents, Washington, D. C."